Figure 1:
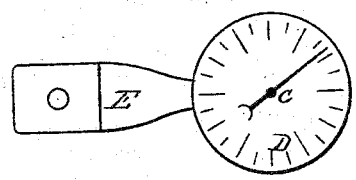

(No Model.)

J. F. MERSHON.
SCREW CUTTING INDICATOR LATHE ATTACHMENT.

No. 281,283. Patented July 17, 1883.

Attest.
Henry P. Morgan.
Wm L. Breath.

Inventor
John F. Mershon.

UNITED STATES PATENT OFFICE.

JOHN F. MERSHON, OF INDIANAPOLIS, INDIANA.

SCREW-CUTTING INDICATOR LATHE ATTACHMENT.

SPECIFICATION forming part of Letters Patent No. 281,283, dated July 17, 1883.

Application filed January 2, 1883. (No model.)

*To all whom it may concern:*

Be it known that I, JOHN F. MERSHON, of the city of Indianapolis, in the county of Marion and State of Indiana, have invented a new and useful Improvement in Attachments for Screw-Cutting Engine-Lathes; and I do hereby declare that the following specification is such a full, clear, and exact description of the same as would enable any person skilled in the art to which it pertains to understand, construct, and operate the same, reference being had to the accompanying drawings, hereto attached and forming part of this specification, and to the letters of reference marked thereon.

The object of my invention is to provide a means whereby, in the operation of cutting screw-threads on an engine-lathe, the usual extra belt and pulley, with reversing clutch or shifter for running the lathe backward between the successive cuts, may be dispensed with and the process much simplified and expedited.

The construction of ordinary screw-cutting lathes is such that the tool-carriage derives its motion while cutting from a long screw of rather coarse pitch, called the "leading-screw," which extends along the frame of the lathe, and is made to revolve, in connection with the spindle, by means of cogged gear-wheels, the pitch of the thread cut being varied by changing these wheels. The tool-carriage is connected with the leading-screw by means of a sliding part-nut, which may be thrown in or out of gear with the screw at the will of the operator. Now, whatever the pitch of the leading-screw may be, it is evident that unless the pitch of the screw to be cut be the same, or some simple multiple thereof, the tool-carriage must preserve throughout the operation the same relative position as to the leading-screw in order that the tool may follow successively the same cut. For this reason screw-cutting lathes are provided with counter-shafts having two loose pulleys driven in opposite directions by means of an open and a crossed belt operated by means of a clutch or shifter to reverse the motion of the lathe, so that when a cut has been made over the thread the tool is withdrawn, the belts shifted, and the lathe run backward until the carriage reaches the point of commencement, the part-nut on the carriage remaining all the time in gear with the screw. It is also evident that were there some means of knowing when the carriage is in the proper relative position as to the screw the extra belt, pulley, and other means provided for reversing the motion of the lathe might be dispensed with and much of the wear of the lathe and time consumed in running backward saved by simply throwing the carriage out of gear at the completion of each cut, running it back quickly by hand, and throwing in gear for the next cut, without reversing or stopping the lathe at all. An attachment which is a simple indicator whereby the proper relative positions of the carriage and leading-screw may instantly be known is the nature of my invention.

Figure 2:
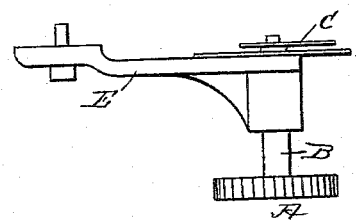
Figure 3:
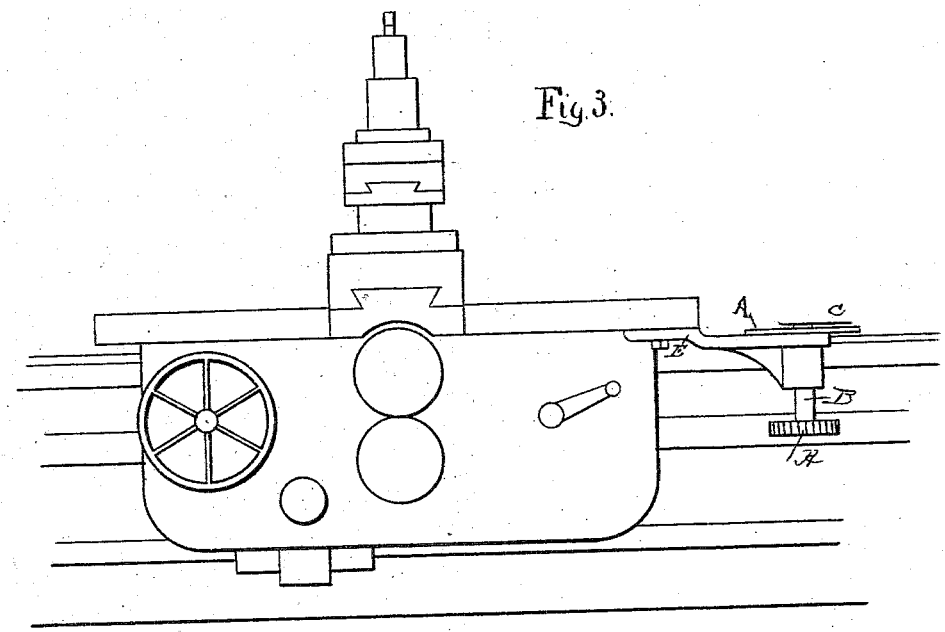

One form of this attachment is clearly shown in the accompanying drawings, where Figure 1 is a plan view, and Fig. 2 an elevation, while in Fig. 3 the attachment is shown in position on the tool-carriage of a lathe.

Like parts are indicated by the same letters in each figure.

I do not confine myself to the particular form shown, as some modifications will be necessary to suit lathes of different constructions. My invention is therefore designed to cover any and all such modifications, so long as they consist of essentially the same parts and operate in substantially the same manner.

The attachment consists of a small worm-wheel, A, secured to the end of a shaft, B, which bears at its other extremity an index-hand, C, capable of revolving over a dial, D, the whole supported by a bracket, E, whereby it may be fastened to the carriage or "apron" of the lathe. The worm-wheel is to be of the same pitch as the leading-screw of the lathe to which it is applied, and the bracket is secured to the carriage in such a way that the wheel gears with the screw, and the index and dial are in plain view of the operator. It will be seen that when the nut is in gear with the leading-screw, so that the carriage is driven by it, the wheel will not revolve at all and the index will maintain one position; but if the nut be thrown out of gear and the carriage be stationary while the screw revolves, or the carriage be moved by hand in a different direction or at a different speed from that at which it would be driven by the leading-screw, the worm-wheel will be driven by the screw and the index will revolve. The worm-wheel thus forms a sort of nut, which, while it remains constantly in gear with the screw, yet permits the carriage to be stopped or moved in either direction. There should be as many divisions on the dial as teeth in the worm-wheel, so that the part-nut may be thrown in gear when the index is opposite any division, and the divisions should be so marked that the dial will show in inches and parts of an inch the space traveled over by the carriage.

The attachment is used in the following manner: While the tool is making its first passage over the thread to be cut, the position of the index on the dial is noted. When this passage is completed, the part-nut is thrown out of gear and the carriage run back to the beginning of the cut by hand. It is then only necessary to allow the index to come to the same position as before and throw the nut in gear, when the tool will follow the former cut correctly. As the dial is so graduated as to show inches of travel of the carriage, all pitches of threads represented by whole numbers may be readily "caught" without waiting for a complete revolution of the dial, care being taken only to start at the proper division of an inch. A little thought will show how the same may be done for most fractional threads; but when the pitch number desired and the number of divisions on the dial have no common measure the thread can be properly caught only at the position where the first cut commenced.

Any workman of ordinary intelligence can quickly learn to use this attachment, which will be found a simple and inexpensive substitute for the cumbersome reversing-gear and a great economizer of time and patience.

I claim as my invention and desire to obtain Letters Patent for—

The indicator consisting of the supporting-bracket E, worm-wheel A, shaft B, dial D, and index C, in combination with the carriage and lead-screw of a screw-cutting engine-lathe, when operating in the manner and for the purpose described.

Indianapolis, Indiana, December 8, 1882.

JOHN F. MERSHON.

Witnesses:
FRANK T. VATER,
H. H. HANNA.